(12) United States Patent
Yang et al.

(10) Patent No.: US 9,746,123 B2
(45) Date of Patent: Aug. 29, 2017

(54) COMPOSITE FREQUENCY-ADJUSTABLE SHOCK ABSORBER

(71) Applicant: GUANGDONG UNIVERSITY OF TECHNOLOGY, Guangzhou (CN)

(72) Inventors: Zhijun Yang, Guangzhou (CN); Youdun Bai, Guangzhou (CN); Xin Chen, Guangzhou (CN); Chaoran Chen, Guangzhou (CN); Chengxiang Li, Guangzhou (CN)

( * ) Notice: Subject to any disclaimer, the term of this patent is extended or adjusted under 35 U.S.C. 154(b) by 0 days.

(21) Appl. No.: 15/376,654

(22) Filed: Dec. 12, 2016

(65) Prior Publication Data
US 2017/0089505 A1    Mar. 30, 2017

Related U.S. Application Data

(63) Continuation of application No. PCT/CN2015/095406, filed on Nov. 24, 2015.

(30) Foreign Application Priority Data

Jun. 16, 2015    (CN) .......................... 2015 1 0332816

(51) Int. Cl.
*F16M 13/00* (2006.01)
*F16M 7/00* (2006.01)
(Continued)

(52) U.S. Cl.
CPC ............. *F16M 7/00* (2013.01); *F16F 15/022* (2013.01); *F16F 15/073* (2013.01); *F16F 2224/02* (2013.01); *F16F 2228/066* (2013.01)

(58) Field of Classification Search
CPC .... F16F 7/00; F16F 15/00; F16F 15/04; F16F 2228/00; F16F 2228/066; F16F 2236/04
(Continued)

(56) References Cited

U.S. PATENT DOCUMENTS

| 5,067,684 | A | * | 11/1991 | Garnjost | ............... F16F 15/027 248/550 |
| 5,156,380 | A | * | 10/1992 | Cerruti | .................... F16F 7/108 188/378 |

(Continued)

*Primary Examiner* — Steven Marsh
(74) *Attorney, Agent, or Firm* — Wayne & King LLC

(57) ABSTRACT

A composite frequency-adjustable shock absorber is provided, comprising a motion main machine stand bar and a shock absorption device, which are arranged on a foundation carrier platform; the shock absorption device is divided into an upper shock absorption device and a lower shock absorption device, the shock absorption device is arranged on a base with an inner cavity, and the upper shock absorption device for suppressing the low-frequency vibration and the lower shock absorption device for absorbing additional high-frequency vibration are connected in series; the upper shock absorption device comprises an elastic component based on a flexible hinge group and a prestress adjusting device, the flexible hinge group is arranged in the inner cavity of the base, the prestress adjusting device for adjusting the inherent frequency of the flexible hinge group is connected with the flexible hinge group, and the motion main machine stand bar is fixed on a load bearing portion of the flexible hinge group. The inherent frequency of the whole flexible hinge group is changed, so the high frequency band and the low frequency band of vibration systems with different masses and different excitation frequencies are effectively isolated, the structure is simple, the adjustment is convenient, and the cost is not high.

9 Claims, 3 Drawing Sheets

(51) Int. Cl.
*F16F 15/02* (2006.01)
*F16F 15/073* (2006.01)

(58) Field of Classification Search
USPC .................................... 248/560, 637, 638
See application file for complete search history.

(56) References Cited

U.S. PATENT DOCUMENTS

| | | | |
|---|---|---|---|
| 8,360,405 B2* | 1/2013 | Stillabower | F16F 3/0876 267/141.4 |
| 2010/0116966 A1* | 5/2010 | Lin | B23Q 11/0032 248/638 |
| 2010/0178183 A1* | 7/2010 | Kaufmann | F16F 15/08 417/472 |
| 2014/0345993 A1* | 11/2014 | Tomiyama | F16F 7/00 188/322.16 |
| 2014/0367547 A1* | 12/2014 | Ohnishi | F16F 1/36 248/638 |

* cited by examiner

COMPOSITE FREQUENCY-ADJUSTABLE SHOCK ABSORBER

CROSS-REFERENCE TO RELATED APPLICATIONS

This application is a continuation of International Patent Application No. PCT/CN2015/095406 with a filing date of Nov. 24, 2015, designating the United States, now pending, and further claims priority to Chinese Patent Application No. 201510332816.9 with a filing date of Jun. 16, 2015. The content of the aforementioned application, including any intervening amendments thereto, are incorporated herein by reference.

TECHNICAL FIELD

The present invention relates to the field of shock absorption devices, and particularly relates to a composite frequency-adjustable shock absorber.

BACKGROUND OF THE PRESENT INVENTION

The shock absorber is mainly used to reduce the vibration output of a vibration source, thereby lowering the noise and reducing the shock on other parts. Most of common shock absorbers are rigid and non-adjustable, i.e. the inherent frequency of the shock absorber is constant and non-adjustable. In actual engineering application, the shock absorber with non-adjustable dynamic characteristics such as the rigidity frequency is always inconvenient to use. For example, the vibration characteristics of the large-sized equipment are highly related to the platform where the equipment is installed, so the original design index of the equipment cannot be achieved in actual use by adopting the rigidity non-adjustable shock absorber. The equipment is difficult to install and debug by assembling multiple groups of the shock absorbers with different rigidity specifications on site. Therefore, the shock absorber with adjustable dynamic characteristics such as the rigidity frequency aids in avoiding the above problem.

An adjustable shock absorber is disclosed in patent 201410169456.0, which is implemented by connecting the traditional elastic elements in parallel; and a plurality of groups of elastic elements and supporting modulators are required, so the cost is relatively high, the working rigidity of the shock absorber in this form cannot be continuously adjusted, and only the pre-set discrete working rigidity can be adjusted.

A composite shock absorber disclosed in patent 201410299504.8 has main defects as follows: (1) the rigidity adjusting unit adopts a magneto-rheological elastomer, thereby being complicated to control and relatively high in cost; (2) a mass adjusting unit adopts a liquid pump to change the liquid storage amount so as to change the mass, the response time of the adjusting unit is relatively long, and additional heavy parts such as a water storage tank is needed, which is not beneficial for the engineering use, and leads to the limited application range.

The shock absorber disclosed in the patent 201410462858.X has the main problem that the magneto-rheological elastomer way is used to adjust the rigidity, so the requirement for the control system is relatively high; and moreover, the overall cost is relatively high, and the application range is limited.

SUMMARY OF PRESENT INVENTION

With regard to the above problems, an objective of the present invention is to provide a composite frequency-adjustable shock absorber, which realizes the composite shock absorption of high and low frequencies in a relatively wide frequency band by adopting a low-cost adjusting solution.

In order to achieve the objective, the present invention adopts a technical solution as follows:

a composite frequency-adjustable shock absorber is provided, comprising a motion main machine stand bar and a shock absorption device, which are arranged on a foundation carrier platform; the shock absorption device is divided into an upper shock absorption device and a lower shock absorption device, the shock absorption device is arranged on a base with an inner cavity, and the upper shock absorption device for suppressing the low-frequency vibration and the lower shock absorption device for absorbing additional high-frequency vibration are connected in series; and the upper shock absorption device comprises a flexible hinge group and a prestress adjusting device, the flexible hinge group is arranged in the inner cavity of the base, the prestress adjusting device for adjusting the inherent frequency of the flexible hinge group is connected with the flexible hinge group, and the motion main machine stand bar is fixed on a load bearing portion of the flexible hinge group.

Further, the flexible hinge group comprises connection side plates arranged in the longitudinal direction and an elastic steel sheet transversely arranged in the base, wherein the connection side plates are respectively fixed at two ends of the elastic steel sheet, and the prestress adjusting device generates stress on the elastic steel sheet by adjusting the distance between each connection side plate and the inner side wall of the base to change the rigidity and inherent frequency of the flexible hinge group.

Further, the prestress adjusting device comprises an adjusting bolt, and the adjusting bolt successively penetrates through the side wall of the base and the connection side plates.

Further, the prestress adjusting device comprises a lead screw and a rotating motor, wherein the lead screw successively penetrates through the side wall of the base and the connection side plates, and the rotating motor drives the lead screw to rotate.

Further, the flexible hinge group is arranged in an inner cavity of an installation frame, and the installation frame is fixed at the upper part of the inner cavity of the base; and the prestress adjusting device generates the stress on the elastic steel sheet by adjusting the distance between each connection side plate and the inner side wall of the installation frame to change the rigidity and inherent frequency of the flexible hinge group.

Further, two sides of a bottom plate of the installation frame adjacent to the connection side plates are provided with a limiting groove, the bottom surface of the limiting groove is lower than the bottom surface of the installation frame, and the width of the limiting groove in the length direction of the elastic steel sheet is greater than the thickness of each connection side plate.

Further, the lower shock absorption device is a damping element.

Further, an anti-loosening bolt with no initial pre-tightening force is provided, and the anti-loosening bolt successively penetrates through the motion main machine stand bar, the flexible hinge group, the lower shock absorption device, the bottom plate of the base and the foundation carrier platform to be fixed by an anti-loosening nut.

Further, the bottom of the base is provided with base fixing bolts, and the base fixing bolts successively penetrate through the bottom plate of the base and the foundation carrier platform.

The present invention has the beneficial effects that: the distance between each connection side plate and the inner side wall of the base is adjusted by the prestress adjusting device, the distance between the connection side plates at two ends of the elastic steel sheet is also changed, the deformation degree of the elastic steel sheet is also led to be changed, and the inherent frequency of the whole flexible hinge group is changed, so the high frequency band and the low frequency band of vibration systems with different masses and different excitation frequencies are effectively isolated, the structure is simple, the adjustment is convenient, and the cost is not high.

Figure 1:
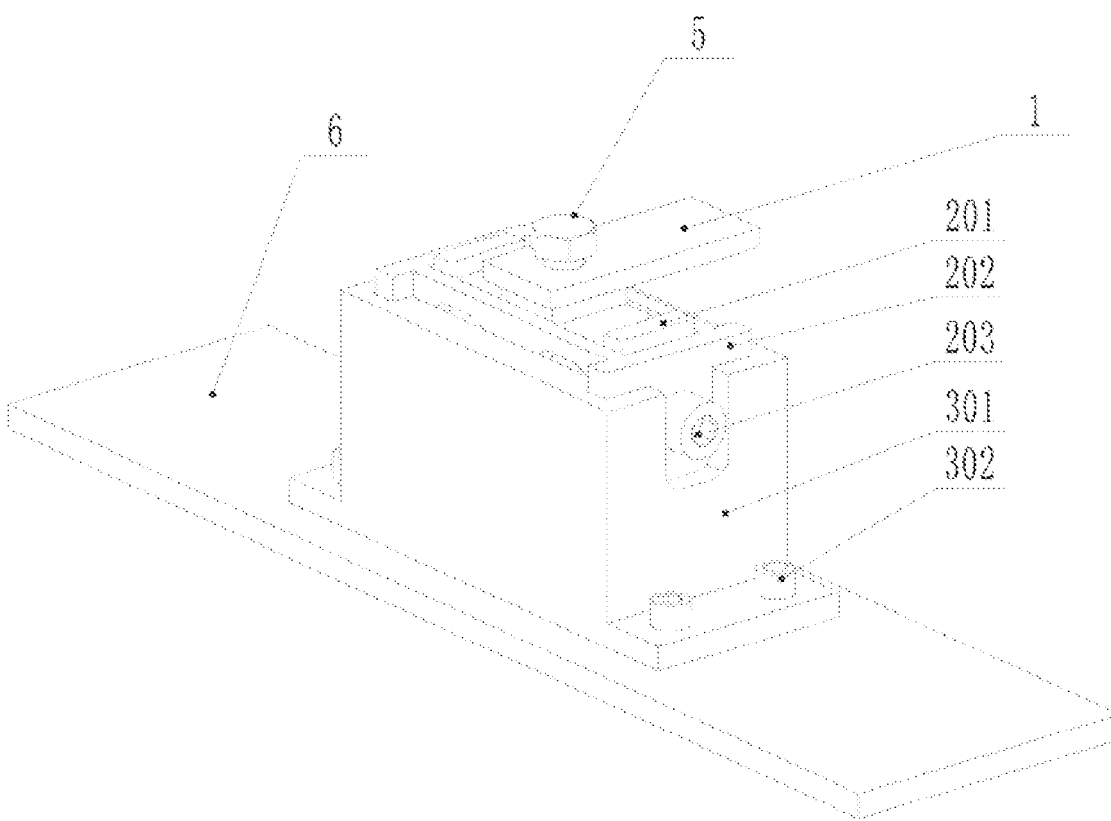
FIG. 1 is an overall axonometric drawing of an embodiment of the present invention.

In the drawings: motion main machine stand bar 1:

flexible hinge group 201; connection side plate 2011; elastic steel sheet 2012; installation frame 202; prestress adjusting device 203:

base 301; base fixing bolt 302;

damping element 4; anti-loosening bolt 5; foundation carrier platform limiting groove 7.

DETAILED DESCRIPTION OF PREFERRED EMBODIMENTS

The technical solution of the present invention is further described' below with reference to drawings and specific embodiments.

As shown in FIG. 1, a composite frequency-adjustable shock absorber comprises a motion main machine stand bar 1 and a shock absorption device, which are arranged on a foundation carrier platform 6; the shock absorption device is divided into an upper shock absorption device and a lower shock absorption device, the shock absorption device is arranged an a base 301 with an inner cavity, and the upper shock absorption device for suppressing the low-frequency vibration and the lower shock absorption device for absorbing additional high-frequency vibration are connected in series.

Figure 2:
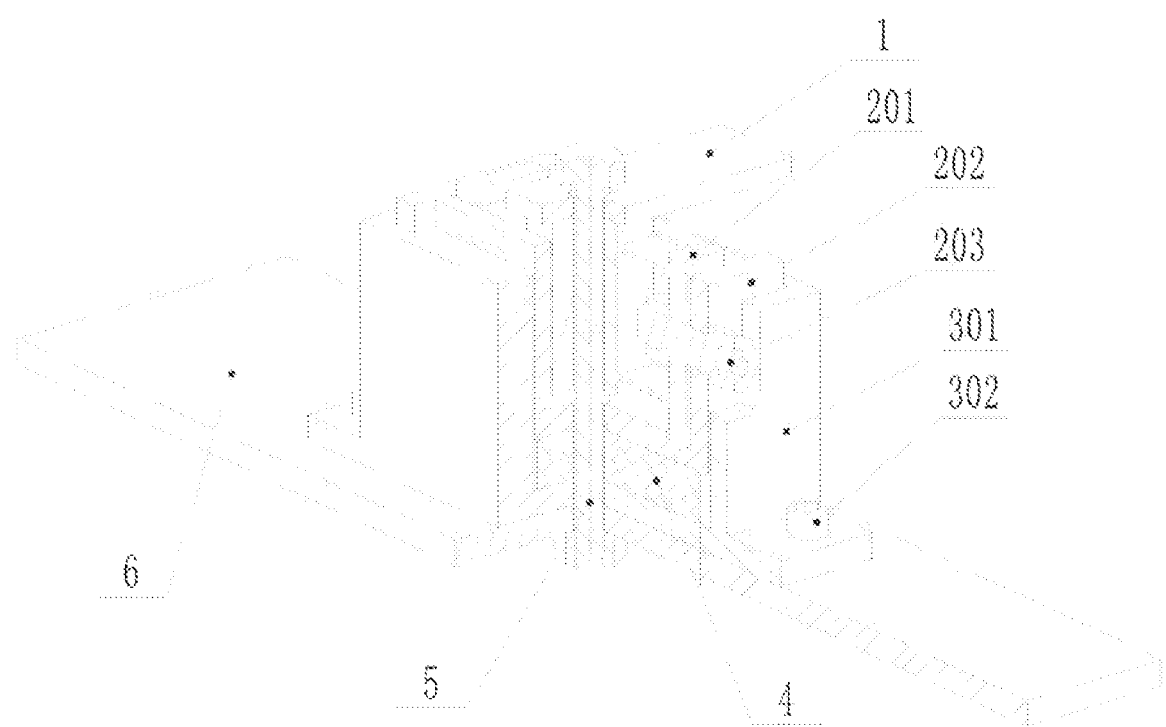
FIG. 2 is an avis-side 4 section view of an embodiment of the present invention.
Figure 3:
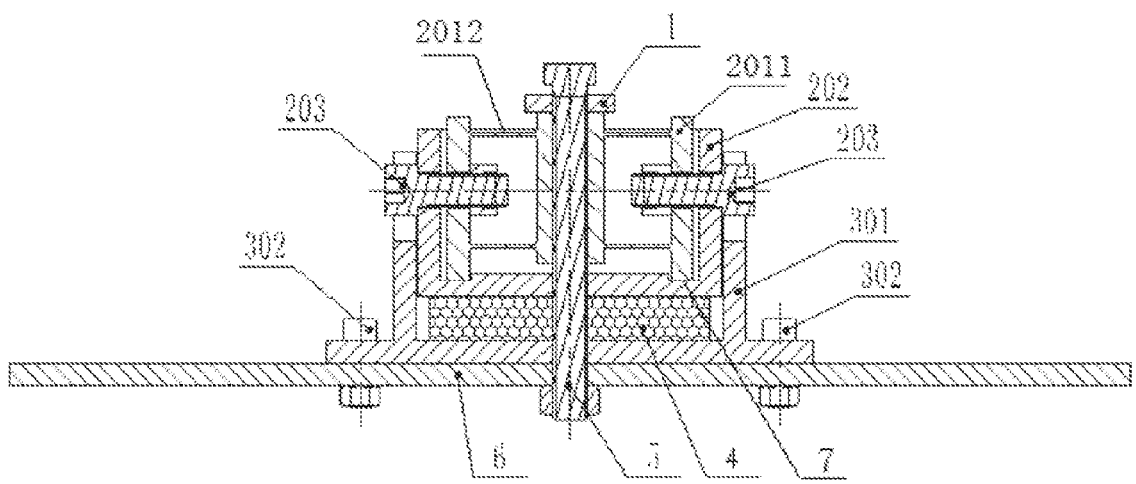
FIG. 3 is front section view of an embodiment of the present invention.

As shown in FIG. 2 and FIG. 3, the upper shock absorption device comprises a flexible hinge group 201 and a prestress adjusting device 203, the flexible hinge group 201 is arranged in the inner cavity of the base 301, the prestress adjusting device 203 for adjusting the inherent frequency of the flexible hinge group 201 is connected with the flexible hinge group 201, and the motion main machine stand bar 1 is fixed on a load bearing portion of the flexible hinge group 201.

Regardless of the damping, the frequency ratio shall satisfy the following conditions to obtain the vibration isolation effect:

$$\lambda = \frac{\omega}{\omega_0} > \sqrt{2}$$

where $\omega$ is an excitation frequency, and $\omega n$ is an inherent frequency:

i.e.

$$\sqrt{\frac{k}{m}} < \frac{\omega}{\sqrt{2}},$$

where k is rigidity, and m is mass.

Therefore, in order to obtain a better vibration isolation effect, a vibration isolator with a relatively low rigidity coefficient shall be adopted or the mass of the machine base shall be increased; and the greater the value of $\lambda$ is, the better the vibration isolation effect is, and $\lambda$ is generally equal to 2.5 to 5 in actual use.

However, since the mass and the excitation frequency of the damped equipment are generally unknown, the traditional shock absorber with the constant rigidity can only be suitable for the equipment with particular mass and particular excitation frequency and cannot meet the requirement for the variation of the mass and drive frequency. The inherent frequency of the system is adjusted by adjusting the rigidity of the flexible hinge, so that the shock absorption performance requirement under different working conditions of different masses and different excitation frequencies can be met.

In the present invention, the inherent frequency of the flexible hinge group 201 is adjusted by the prestress adjusting device 203 so as to adapt to the low-frequency vibration isolation requirement of different masses and different excitation frequencies; the flexible hinge group 201 is arranged in the inner cavity of the base 301, the side wall of the inner cavity of the base 301 is used to bear the adjusting force and to limit the amplitude, thereby preventing the failure of flexible hinges; the lower shock absorption device is arranged in the lower part of the inner cavity of the base 301 and used to absorb the high-frequency vibration energy; and in the present technical solution, the high-frequency band and the low-frequency band of the vibration systems with different masses and different excitation frequencies are effectively isolated by adjusting the frequency and absorbing the vibration through the high-frequency shock absorption device, so the operation is simple, and the cost is low.

The flexible hinge group 201 comprises connection side plates 2011 arranged in the longitudinal direction and an elastic steel sheet 2012 transversely arranged in the base 301, wherein the connection side plates 2011 are respectively fixed at two ends of the elastic steel sheet 2012, the prestress adjusting device 203 generates stress on the elastic steel sheet 2012 by adjusting the distance between each connection side plate 2011 and the inner side wall of the base 301 to change the rigidity and inherent frequency of the flexible hinge group.

The distance between each connection side plate 2011 and the inner side wall of the base 301 is adjusted by the prestress adjusting device 203, the distance between the connection side plates 2011 at two ends of the elastic steel sheet 2012 is changed, the deformation degree of the elastic steel sheet 2012 is also led to be changed, and the inherent frequency of the whole flexible hinge group 201 is changed, so that the high frequency band and the low frequency band of the vibration systems with different masses and different excitation frequencies are effectively isolated, the structure is simple, the adjustment is convenient, and the cost is not high.

The prestress adjusting device 203 adjusts the distance between each connection side plate 2011 and the inner side wall of the base 301 from two ends or one end of the elastic steel sheet 2012 to make the deformation degree of the elastic steel sheet 2012 changed, so the adjusting way is flexible and simple.

In the present embodiment, the connection side plates 2011 and the elastic steel sheet 2012 are of an integrated structure and obtained by milling and electric discharge machining of a whole block of materials, thereby preventing assembling errors of components, and improving the motion precision.

The prestress adjusting device 203 comprises adjusting bolts, and the adjusting bolts successively penetrate through the side wall of the base 301 and the connection side plates 2011.

An embodiment structure of the prestress adjusting device 203; a big end of the adjusting bolt is disposed on the outer side wall of the base 301; a small end successively penetrates through the side wall of the base 301 and the connection side plates 2011; when the adjusting bolts at two ends of the elastic steel sheet 2012 are manually adjusted to be screwed towards the inner side direction of the base 301, the connection side plates 2011 move in a direction away from the inner side wall of the base 301, the elastic steel sheet 2012 is under a squeezing force from two ends to the interior, and the rigidity is increased; and otherwise, the rigidity is reduced, the inherent frequency of the system is influenced by the inherent characteristic—the rigidity of the system, and the inherent frequency is changed along with the change of the rigidity, so the manual adjustment is flexible and convenient.

The prestress adjusting device 203 comprises a lead screw and a rotating motor, wherein the lead screw successively penetrates through the side wall of the base 301 and the connection side plates, and the rotating motor drives the lead screw to rotate.

Another embodiment structure of the prestress adjusting device 203; the lead screw successively penetrates through the side wall of the base 301 and the connection side plates 2011; the lead screw is connected with the connection side plates 2011 in a threading manner; the rotating motor drives the lead screw to rotate to enable the connection side plates 2011 to move in the direction away from the inner side wall of the base 301; the elastic steel sheet 2012 is under the squeezing force from two ends to the interior; and the rigidity is increased; and otherwise, the rigidity is reduced, the inherent frequency of the system is influenced by the inherent characteristic—the rigidity of the system, the inherent frequency is changed along with the change of the rigidity, and by adopting the drive motor, the automation adjusting precision is high.

The flexible hinge group 201 is arranged in the inner cavity of an installation frame 202, and the installation frame 202 is fixed on the upper part of the inner cavity of the base 301; and the prestress adjusting device 203 generates the stress on the elastic steel sheet 2012 by adjusting the distance between each connection side plate 2011 and the inner side wall of the installation frame 202 to change the rigidity and inherent frequency of the flexible hinge group.

The flexible hinge group 201 is arranged in the installation frame 202; the prestress adjusting device 203 adjusts the distance between the connection side plates 2011 and the inner side wall of the installation frame 202; and when in installation, the installation frame 202 is placed into the inner cavity of the base 301, thereby being convenient and accurate to install and guaranteeing the frequency adjustment and shock absorption effect.

Two sides of a bottom plate of the installation frame 202 adjacent to the connection side plates 2011 are provided with a limiting groove 7, the bottom surface of the limiting groove 7 is lower than the bottom surface of the installation frame 202, and the width of the limiting groove 7 in the length direction of the elastic steel sheet 2012 is greater than the thickness of each connection side plate 2011.

The limiting groove 7 facilitates the positioning of the connection side plates 2011 when in installation; and when the adjustment is performed through the connection side plates 2011, a motion range of the connection side plates 2011 is limited, thereby avoiding a poor shock absorption effect due to great deformation of the elastic steel sheet 2012.

The lower shock absorption device is a damping element.

The lower shock absorption device is the damping element for absorbing the high frequency, is directly arranged in the inner cavity of the base 301 and is connected with the upper shock absorption device to form a two-level vibration isolation system, so the shock absorption effect is optimum.

An anti-loosening bolt 5 with no initial pre-tightening force is provided, and the anti-loosening bolt 5 successively penetrates through the motion main machine stand bar 1, the flexible hinge group 201, the lower shock absorption device 4, the bottom plate of the base 301 and the foundation carrier platform 6 to be fixed by an anti-loosening nut.

The flexible hinge group 201 and the lower shock absorption device 4 are connected in series through the anti-loosening bolt 5 which penetrates through the motion main machine stand bar 1, the flexible hinge group 201, the lower shock absorption device 4, the bottom plate of the base 301 and the foundation carrier platform 6 and are fixed in the base 301, no initial pre-tightening force is applied to the anti-loosening bolt 5, and the anti-loosening bolt is mainly used to prevent the accidental separation of the motion main machine stand bar 1 under extreme conditions.

However, in the present embodiment, the motion main machine stand bar 1 is provided with a hollow cavity which is used for the anti-loosening bolt 5 to pass through; after the motion main machine stand bar 1 is inserted into the load bearing portion of the flexible hinge group 201, the anti-loosening bolt 5 is inserted into the hollow cavity of the motion main machine stand bar 1 and then successively penetrates through the lower shock absorption device 4, the bottom plate of the base 301 and the foundation carrier platform 6 to be fixed by the anti-loosening nut, so the structure is simple, and the installation is convenient.

The bottom of the base 301 is provided with base fixing bolts 302, and the base fixing bolts 302 successively penetrate through the bottom plate of the base 301 and the foundation carrier platform 6.

The base 301 is fixed through the base fixing bolts 302, thereby preventing the accidental separation of the motion main machine stand bar 1 and the whole shock absorption device under the extreme conditions, and guaranteeing the use.

The technical principle of the present invention is described above in combination with specific embodiments. These descriptions are only used to explain the principle of the present invention, rather than limiting the protection scope of the present invention in any form. Based on the explanation herein, other specific implementation ways of the present invention can be conceived by those skilled in the art without contributing inventive effort, while these implementation ways fall within the protection scope of the present invention.

We claim:

1. A composite frequency-adjustable shock, absorber, comprising a motion main machine stand bar and a shock absorption device, which are arranged on a foundation carrier platform, and characterized in that the shock absorption device is divided into an upper shock absorption device and a lower shock absorption device, the shock absorption device is arranged on a base with an inner cavity, the upper shock absorption device for suppressing low-frequency vibration and the lower shock absorption device for absorbing additional high-frequency vibration are connected in series; and the upper shock absorption device comprises a flexible hinge group and a prestress adjusting device, the flexible hinge group is arranged in the inner cavity of the base, the prestress adjusting device for adjusting an inherent frequency of the flexible hinge group is connected with the flexible hinge group, and the motion main machine stand bar is fixed on a load portion of the flexible hinge group.

2. The composite frequency-adjustable shock absorber according to claim 1, characterized in that the flexible hinge group comprises connection side plates arranged in a longitudinal direction and an elastic steel sheet transversely arranged in the base, the connection side plates are respectively fixed at two ends of the elastic steel sheet, and the prestress adjusting device generates stress on the elastic steel sheet by adjusting a distance between each connection side plate and an inner side wall of the base to change rigidity and inherent frequency of the flexible hinge group.

3. The composite frequency-adjustable shock absorber according to claim 2, characterized in that the prestress adjusting device comprises an adjusting bolt, and the adjusting bolt successively penetrates through the side wall of the base and the connection side plates.

4. The composite frequency-adjustable shock absorber according to claim 2, characterized in that the prestress adjusting device comprises a lead screw and a rotating motor, the lead screw successively penetrates through the side wall of the base and the connection side plates, and the rotating motor drives the lead screw to rotate.

5. The composite frequency-adjustable shock absorber according to claim 2, characterized in that the flexible hinge group is arranged in an inner cavity of an installation frame, and the installation frame is fixed on the upper part of the inner cavity of the base; and the prestress adjusting device generates the stress on the elastic steel sheet by adjusting the distance between each connection side plate and the inner side wall of the installation frame to change the rigidity and inherent frequency of the flexible hinge group.

6. The composite frequency-adjustable shock absorber according to claim 5, characterized in that two sides of a bottom plate of the installation frame adjacent to the connection side plates are provided with a limiting groove, a bottom surface of the limiting groove is lower than a bottom surface of the installation frame, and a width of the limiting groove in a length direction of the elastic steel sheet is greater than a thickness of each connection side plate.

7. The composite frequency-adjustable shock absorber according to claim 1, characterized in that the lower shock absorption device is a damping element.

8. The composite frequency-adjustable shock absorber according to claim 1, characterized in that an anti-loosening bolt with no initial pre-tightening force is provided, and the anti-loosening bolt successively penetrates through the motion main machine stand bar, the flexible hinge group, the lower shock absorption device, a bottom plate of the base and the foundation carrier platform to be fixed by an anti-loosening nut.

9. The composite frequency-adjustable shock absorber according to claim 1, characterized in that a bottom of the base is provided with base fixing bolts, and the base fixing bolts successively penetrate through the bottom plate of the base and the foundation carrier platform.

* * * * *